(12) United States Patent
Barakat

(10) Patent No.: US 9,261,068 B2
(45) Date of Patent: Feb. 16, 2016

(54) HYDROELECTRIC POWER GENERATING SYSTEM

(71) Applicant: Yaser K. Barakat, Roanoke, VA (US)

(72) Inventor: Yaser K. Barakat, Roanoke, VA (US)

(*) Notice: Subject to any disclaimer, the term of this patent is extended or adjusted under 35 U.S.C. 154(b) by 34 days.

(21) Appl. No.: 14/182,237

(22) Filed: Feb. 17, 2014

(65) Prior Publication Data

US 2014/0197641 A1 Jul. 17, 2014

Related U.S. Application Data

(63) Continuation-in-part of application No. 14/156,408, filed on Jan. 15, 2014.

(60) Provisional application No. 61/753,302, filed on Jan. 16, 2013.

(51) Int. Cl.
| | |
|---|---|
| *F03B 13/00* | (2006.01) |
| *H02P 9/04* | (2006.01) |
| *F03B 13/10* | (2006.01) |
| *F03B 13/12* | (2006.01) |
| *E02B 13/00* | (2006.01) |
| *E02B 9/00* | (2006.01) |
| *E02B 7/40* | (2006.01) |
| *E02B 3/10* | (2006.01) |
| *E02B 7/02* | (2006.01) |
| *F03B 13/06* | (2006.01) |

(52) U.S. Cl.
CPC ................ *F03B 13/00* (2013.01); *F03B 13/06* (2013.01); *Y02E 10/22* (2013.01); *Y02E 60/17* (2013.01)

(58) Field of Classification Search
CPC ................................ Y02E 10/20; Y02E 10/22
USPC ............... 405/39, 40, 41, 78, 83, 84, 87, 101, 405/107; 290/43, 54
See application file for complete search history.

(56) References Cited

U.S. PATENT DOCUMENTS

| | | | | |
|---|---|---|---|---|
| 1,797,517 | A * | 3/1931 | Simchuk ....................... 405/107 |
| 2,163,102 | A | 6/1939 | Odill | |
| 2,632,625 | A * | 3/1953 | Wales ............................ 415/145 |
| 2,910,833 | A * | 11/1959 | Pancheri ......................... 405/83 |
| 2,962,599 | A * | 11/1960 | Pirkey ........................... 290/4 R |

(Continued)

FOREIGN PATENT DOCUMENTS

| | | |
|---|---|---|
| CN | 2880912 | 3/2007 |
| CN | 2880912 Y * | 3/2007 |

(Continued)

*Primary Examiner* — Tulsidas C Patel
*Assistant Examiner* — Charles Reid, Jr.
(74) *Attorney, Agent, or Firm* — Richard C. Litman

(57) ABSTRACT

The hydroelectric power generating system incorporates a man-made dam structure configured to completely enclose a body of water. The dam is preferably filled by pumping seawater into the reservoir defined by the encircling dam. A circumferential canal feeds water to one or more penstocks. Each penstock has one or more hydroelectric turbine generators installed therealong. The penstocks feed an enclosed circumferential channel about the base of the dam. The channel delivers water to a pump that pumps the water back into the bottom of the reservoir. An auxiliary hydroelectric power generating system disposed within the dam utilizes the water exiting from the lower end of the penstocks for additional production of energy. While this system results in a net loss of energy, the system can make use of surplus power to drive the return pump during periods of low electrical demand in order to replenish the reservoir.

5 Claims, 7 Drawing Sheets

(56) References Cited

U.S. PATENT DOCUMENTS

| | | | | |
|---|---|---|---|---|
| 3,523,192 | A | * | 8/1970 | Lang ............................ 290/52 |
| 3,939,356 | A | * | 2/1976 | Loane ........................... 290/52 |
| 3,991,900 | A | * | 11/1976 | Burke et al. ................. 220/219 |
| 4,182,123 | A | * | 1/1980 | Ueda ............................. 60/325 |
| 4,282,444 | A | * | 8/1981 | Ramer .......................... 290/52 |
| 4,392,062 | A | * | 7/1983 | Bervig .......................... 290/54 |
| 4,569,200 | A | * | 2/1986 | Lamb ............................ 60/398 |
| 4,691,115 | A | * | 9/1987 | Robinson ..................... 290/1 R |
| 4,698,516 | A | * | 10/1987 | Thompson .................... 290/54 |
| 4,767,938 | A | * | 8/1988 | Bervig .......................... 290/54 |
| 4,786,205 | A | * | 11/1988 | Hisken et al. ................. 405/52 |
| 4,845,376 | A | * | 7/1989 | Bendiks ........................ 290/54 |
| 4,941,771 | A | * | 7/1990 | Perper .......................... 405/78 |
| 5,608,268 | A | * | 3/1997 | Senanayake .................. 290/54 |
| 6,312,191 | B1 | * | 11/2001 | Rosenfeld ..................... 405/37 |
| 2009/0152871 | A1 | * | 6/2009 | Ching ........................... 290/54 |
| 2009/0206609 | A1 | | 8/2009 | Wood |
| 2010/0209192 | A1 | * | 8/2010 | Behm et al. ................... 405/87 |
| 2011/0204645 | A1 | * | 8/2011 | Jacobson ...................... 290/54 |
| 2011/0233937 | A1 | * | 9/2011 | Riley ............................ 290/54 |
| 2011/0241345 | A1 | | 10/2011 | Chen |
| 2012/0061967 | A1 | | 3/2012 | Chaganti et al. |
| 2012/0074703 | A1 | | 3/2012 | Lin |
| 2012/0098267 | A1 | * | 4/2012 | Hockenberger et al. ....... 290/54 |
| 2012/0187690 | A1 | | 7/2012 | Walton et al. |
| 2012/0299304 | A1 | | 11/2012 | Al-Saffer |

FOREIGN PATENT DOCUMENTS

| | | |
|---|---|---|
| GB | 2475606 | 5/2011 |
| JP | H 09177654 | 7/1997 |
| JP | H09177654 A * | 7/1997 |

* cited by examiner

HYDROELECTRIC POWER GENERATING SYSTEM

CROSS-REFERENCE TO RELATED APPLICATIONS

This is a continuation-in-part of my presently pending U.S. Non-Provisional patent application Ser. No. 14/156,408, filed on Jan. 15, 2014, which claims the benefit of my U.S. Provisional Patent Application Ser. No. 61/753,302, filed Jan. 16, 2013.

BACKGROUND OF THE INVENTION

1. Field of the Invention

The present invention relates to electrical power generating systems, and particularly to a hydroelectric power generating system incorporating man-made reservoirs that each have one or more penstocks extending from a common waterway and one or more electrical generating turbines disposed along each of the penstocks.

2. Description of the Related Art

Hydroelectric power generating systems have been known for a considerable period of time. Conventional systems utilize a natural geographic basin, valley, or the like, and place a man-made dam across a channel in the natural terrain to create a reservoir upstream of the dam. The water is then made to flow through one or more power generating turbines in the dam (or in a powerhouse constructed with the dam), to generate electrical power. Generally, only a single generating turbine is installed in each penstock of the facility, although multiple penstocks are common in a single conventional hydroelectric power generating system.

An example of such a conventional hydroelectric power generating system is found in Japanese Patent Publication No. 9-177,654, published on Jul. 11, 1997. This reference describes (according to the drawings and English abstract) a hydroelectric power generating system incorporating a single penstock run with multiple generating turbines installed therealong. One embodiment is illustrated having an upstream reservoir and dam and a second downstream reservoir and dam, and generating turbines installed downstream of each dam.

Another example is found in Chinese Patent Publication No. 2,880,912 published on Mar. 21, 2007 to Wu Jinnan. A plurality of generating turbines is installed in series along stepped concrete bases downstream of the dam.

Thus, a hydroelectric power generating system solving the aforementioned problems is desired.

SUMMARY OF THE INVENTION

The hydroelectric power generating system comprises a man-made dam structure that completely encircles a water reservoir enclosed therein. The water may be pumped from a variety of sources, such as the ocean, as well as rivers, lakes, and streams. The man-made dam structure and transport of the water enables the hydroelectric power generating system to be constructed virtually anywhere, so long as there is sufficient land available for the facility. The dam may be substantially circular, or may have any other desired configuration. At least one sluice gate, and preferably a plurality of such gates, feeds a peripheral canal near the top of the dam. The peripheral canal, in turn, feeds at least one penstock, and preferably a plurality of such penstocks. Each penstock includes at least one electrical generating turbine, and preferably a plurality of such turbines, therealong. The downstream end of the penstock or penstocks feed into an enclosed circumferential channel within the base of the dam. A return line extends from the channel through the base of the dam and into the reservoir. A pump is installed in the return line, enabling water to be pumped from the return line back into the reservoir. While this system results in a net loss of energy, it does enable the reservoir to be replenished during periods where surplus electrical energy is available.

The system uses water to generate essentially "clean" energy. Construction of a sufficient number of such facilities, and/or of sufficient water volume, would result in some slight reduction in sea level as water is drawn from the oceans to the reservoirs. The reservoirs would also serve as convenient water recreational sites, as any number of such facilities could be constructed convenient to large population centers, as opposed to conventional hydroelectric dams and their reservoirs. The hydroelectric power generating system would make use of salt water from the sea, rather than fresh water. The dissolved salt and minerals in the water may prove to be of some benefit to some individuals. Also, it is anticipated that the relatively large volume of ocean water captured within the dams would provide a practical environment for the farming of many ocean-dwelling fish and other marine life, as well as serving to protect endangered species of marine life.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The hydroelectric power generating system greatly expands upon the availability of conventional hydroelectric power systems, using a relatively small man-made dam extending across a natural channel to form a reservoir enclosed by natural terrain. While such facilities are quite valuable for the power they produce, as well as for their recreational and flood control benefits, the number of such facilities is limited by the lack of availability of natural terrain permitting their construction and efficient operation.

Figure 1:
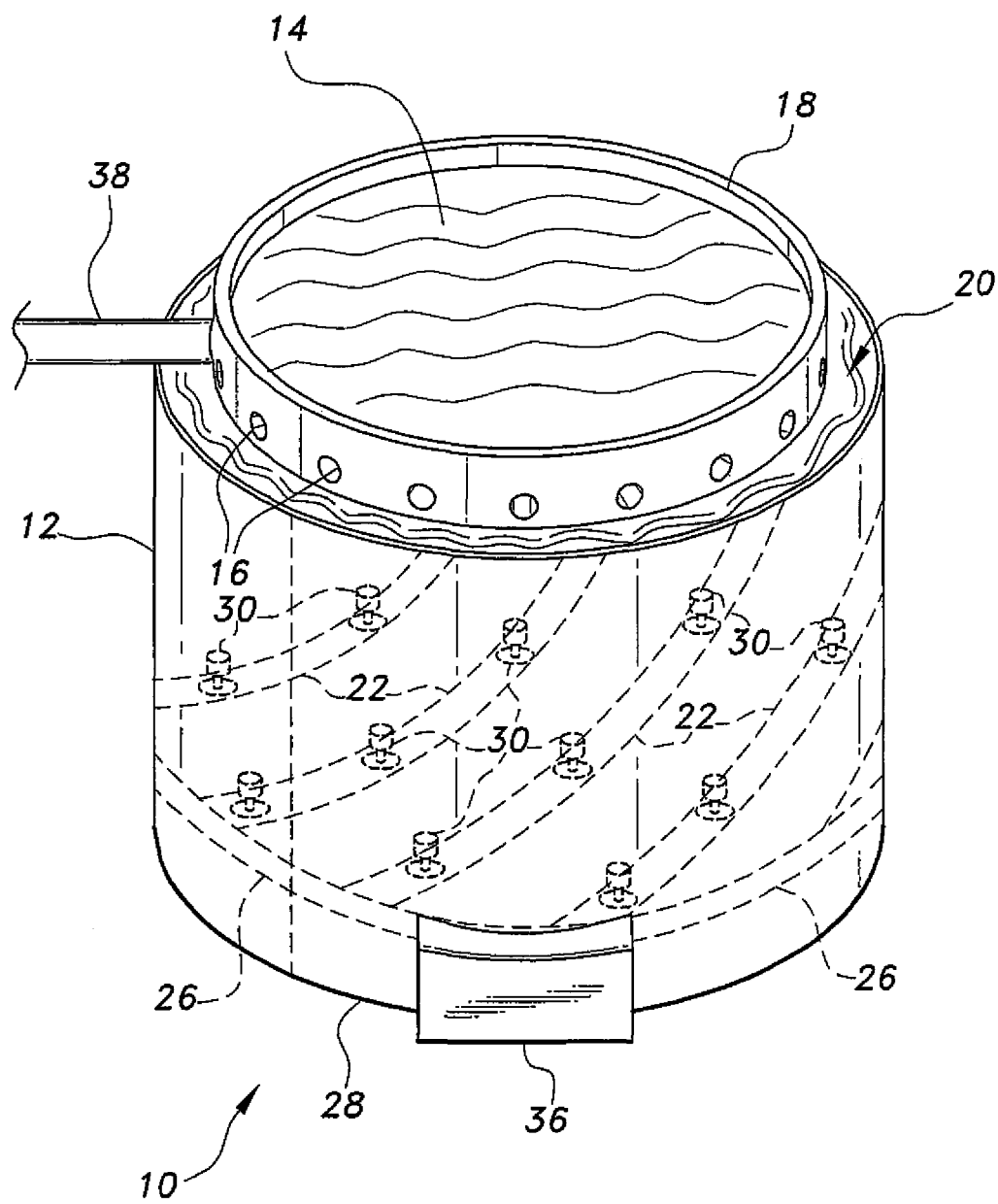
FIG. 1 is a diagrammatic perspective view of a hydroelectric power generating system according to the present invention, illustrating its general features.

FIG. 1 of the drawings provides a diagrammatic perspective view of an exemplary hydroelectric power generating system 10 according to the present invention. The system 10 incorporates a relatively large dam 12 or wall defining a dam that completely encircles or laterally encloses a reservoir 14 therein. The dam 12 may have a generally cylindrical configuration, as shown in FIG. 1, or may have any other desired external shape or configuration. The dam 12 includes at least one sluice gate 16 (and preferably a plurality of sluice gates 16) extending through the upper portion 18 thereof. The sluice gates 16 permit the flow of water from the upper levels of the reservoir 14 through the dam 12 and into an externally disposed peripheral canal 20 that surrounds the upper portion 18 of the dam 12.

Figure 2:
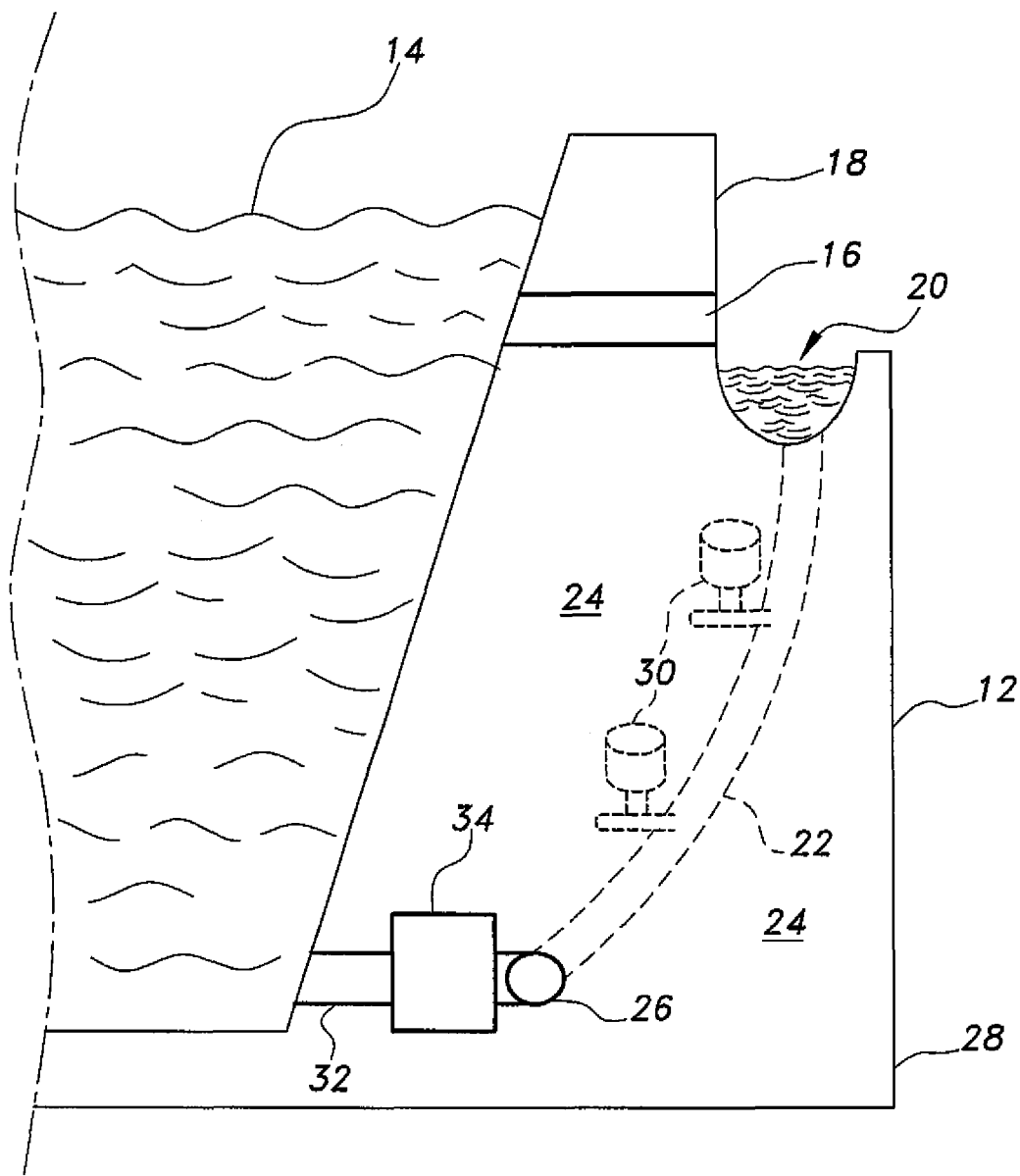
FIG. 2 is a diagrammatic elevation view in section of the hydroelectric power generating system according to the present invention, illustrating further details thereof.

At least one penstock 22 (preferably a plurality of penstocks 22) extends from the peripheral canal 20 downward through the interior 24 of the dam 12 to an internal collection channel 26 disposed within the base 28 of the dam 12. The penstocks 22 do not descend vertically within the interior 24 of the dam 12, but describe helical arcs as each of the penstocks 22 traverses a portion of the circumference of the dam 12, generally as illustrated in FIGS. 1 and 2 of the drawings. Each penstock 22 includes at least one (and preferably a plurality of) hydroelectric turbine generator 30 installed therealong. The installation of a plurality of generators 30 in each penstock 22 provides additional power recovery from the energy developed by the water as it continues to flow through the penstock from the uppermost generator 30.

Water flows from the upper level of the reservoir 14 through the sluice gates 16 and into the peripheral upper canal 20. Water flow through the sluice gates 16 may be controlled by conventional gate valves or the like. The water then flows downward through the penstocks 22 to operate the generators 30 for electrical power generation. Each of the penstocks 22 may also include a conventional gate valve or other water control or shutoff device. The water then flows from the lower ends of the penstocks 22 into the internal collection channel 26 within the interior 24 of the base 28 of the dam 12. A return passage 32 extends from the collection channel 26 and the lower level of the reservoir 14, as shown in FIG. 2. As water seeks its own level, it will be seen that there will be no net flow through the system when the water level in the reservoir 14 is equal to the water level in the peripheral canal 20. However, a pump 34 is provided in or along the return passage 32 to deliver water from the collection channel 26 back into the reservoir 14. While only a single return passage 32 and pump 34 are shown, it will be understood that a plurality of return passages and pumps may be provided, if desired. While the power required to operate the pump 34 is greater than the power generated by the hydroelectric turbine generators 30, the pump 34 may be operated at times of low electrical power demand by consumers to enable the hydroelectric power generating system 10 to function. A powerhouse 36 is provided external to the base 28 of the dam 12 to control and distribute electrical power generated by the system, and to control and operate the pump 34 as well. A conventional external energy source provides the energy to operate the powerhouse.

The system 10 as described above is a closed system, i.e., water is not permitted to escape the system, except by evaporation and/or leakage. This is because the water to be used in the system 10 is taken from the sea, i.e., it is salt water unsuited for irrigation or potable consumption. The salt water is pumped from a suitable oceanic source through a seawater delivery line 38 that communicates with the reservoir 14, as shown in FIG. 1, to fill the reservoir volume 14 initially. The use of seawater with the hydroelectric power generation system 10 may provide a number of benefits. The construction of a large number of very large systems on otherwise unusable land (desert, etc.) could accept a small percentage of the water of the present oceans and seas of the planet, and thereby reduce the rising sea level trend that has developed, at least to some small extent. The recreational value of such installations when constructed near large population centers has been noted further above. Some persons may find that swimming or bathing in the salt water may provide certain benefits, and the construction of such systems convenient to their homes serves to facilitate access. The relatively large volume of salt water contained by very large dams 12, or by a series of such dams 12, will provide support for a large number of fish and other marine animals. These fish and/or marine animals may be harvested for edible consumption, and/or the reservoir volumes may serve as habitats for endangered species. Accordingly, the present hydroelectric power generating system provides a number of benefits in addition to potential power production.

Figure 3:
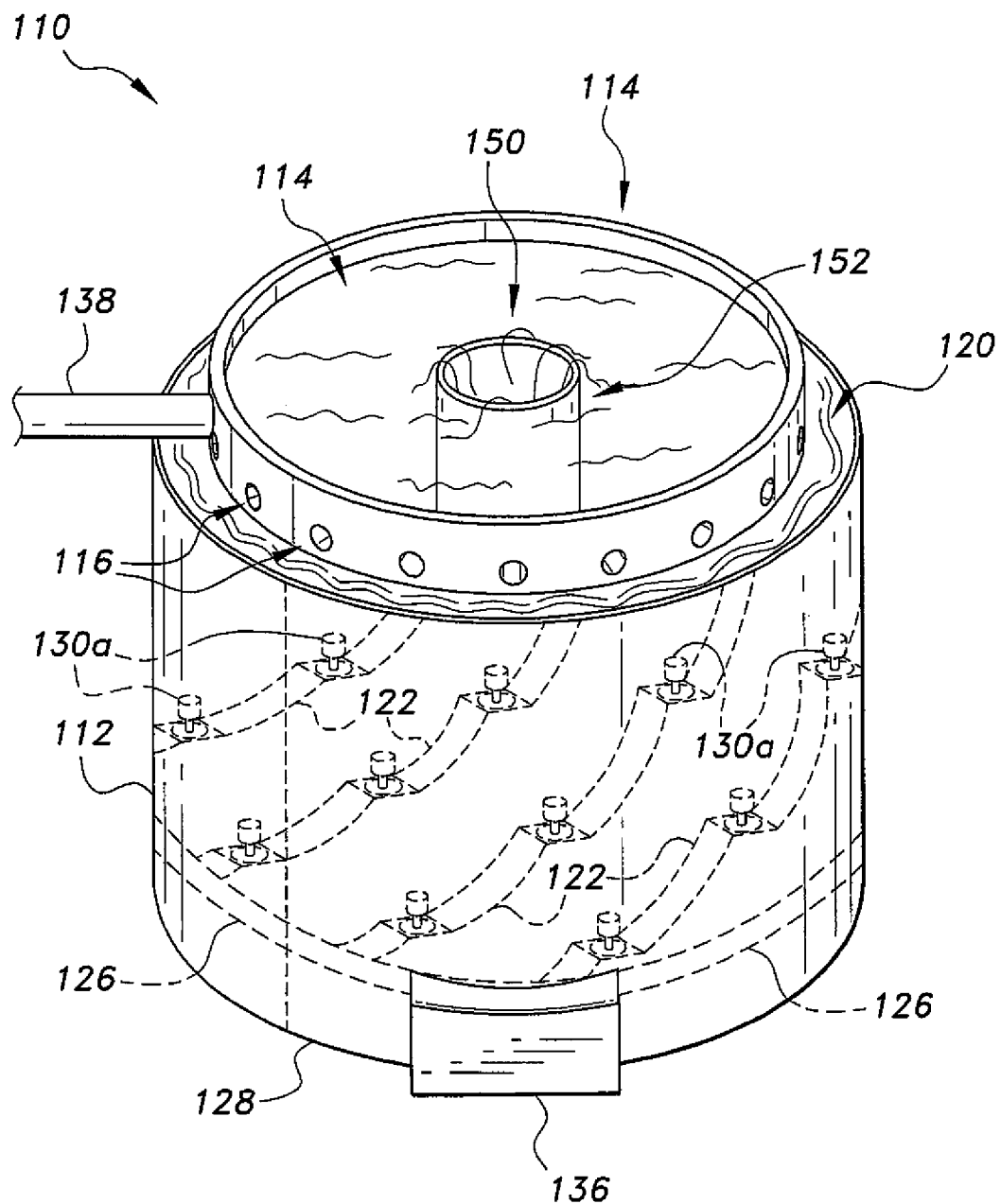
FIG. 3 is a diagrammatic perspective view of another embodiment of a hydroelectric power generating system according to the present invention, illustrating its general features.
Figure 4:
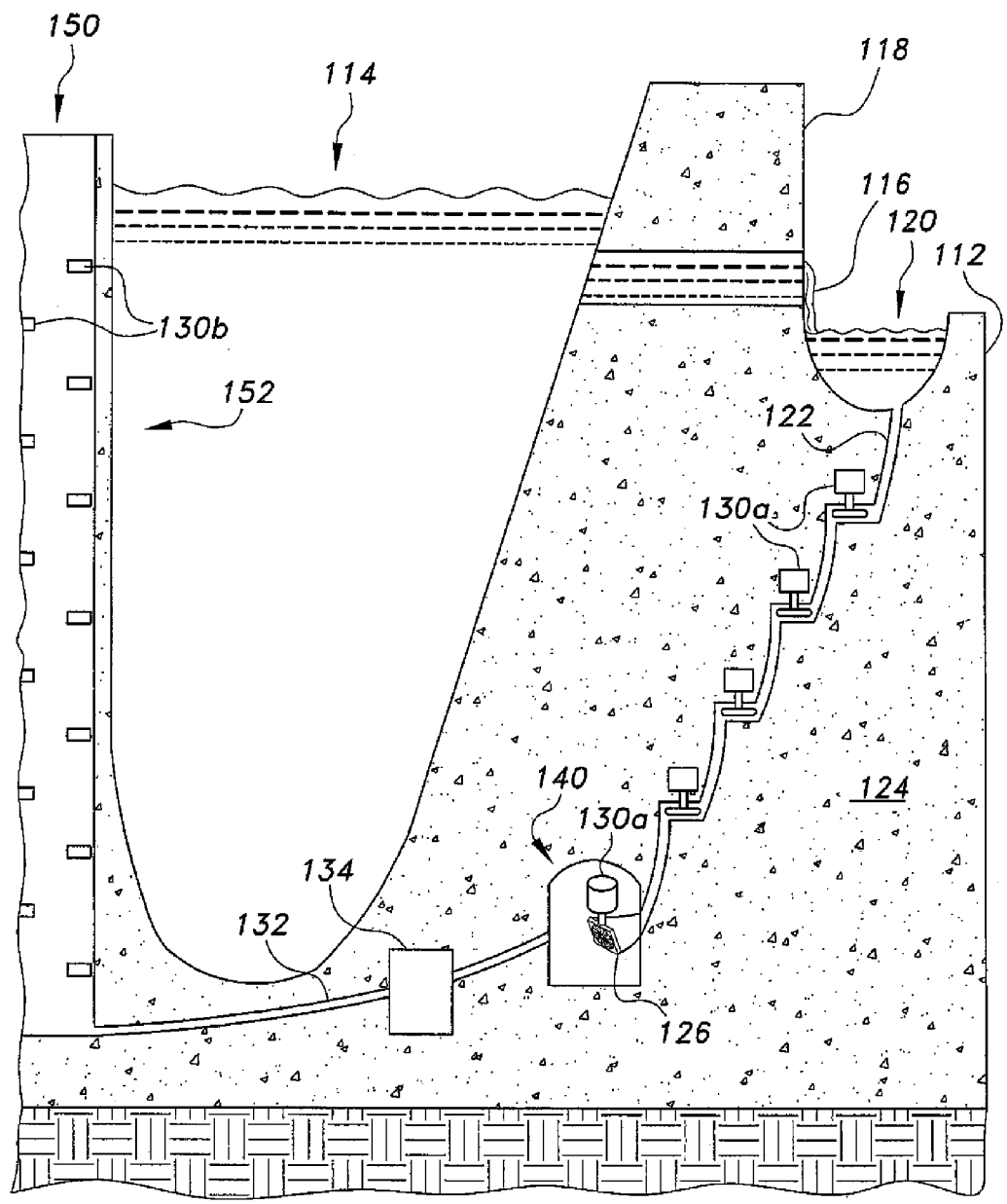
FIG. 4 is a diagrammatic sectional view of the hydroelectric power generating system shown in FIG. 3, illustrating its general features.

FIGS. 3-5, 6A, and 6B of the drawings shows another embodiment of a hydroelectric power generating system 110, which includes features that enhance the utilization of hydrodynamics to produce energy. Referring to FIG. 3 of the drawings, the hydroelectric power generating system 110 incorporates a relatively large dam 112 or wall defining a dam that completely encircles or laterally encloses a reservoir 114 therein, and an auxiliary power generating system 150 within said reservoir 114. The dam 112 can have a generally cylindrical configuration, as shown in FIG. 3, or may have any other desired external shape or configuration. The dam 112 includes at least one sluice gate 116 (and preferably a plurality of sluice gates 116) extending through the upper portion 118 thereof and an annular tunnel 140 within the interior 124 of the base 128 of the dam 112, as generally illustrated in FIG. 4 of the drawings. The sluice gates 116 permit the flow of water from the upper levels of the reservoir 114 through the upper portion 118 and into an externally disposed peripheral canal 120 that surrounds the upper portion 118 of the dam 112.

At least one penstock 122 (preferably a plurality of penstocks 122) extend downward from the peripheral canal 120 through the interior 124 of the dam 112. The penstocks 122 do not descend vertically within the internal structure 124 of the dam 112, but are arranged in a step configuration and describe generally helical arcs as each of the penstocks 122 traverses a portion of the circumference of the dam 112. As such, the step configuration follows a general spiral curve. Each penstock 122 includes at least one (and preferably a plurality of) hydroelectric turbine generator 130a installed therealong. The installation of a plurality of hydroelectric turbine generators 130a in each penstock 122 provides additional power recovery from the energy developed by the water as it continues to flow downward through the penstock 122 from the uppermost hydroelectric turbine generator 130a. The step configuration provides stable support and allows for greater variety in the arrangement and utilization of multiple hydroelectric turbine generators 130a in each penstock 122. Depending on the amount of energy required, it is possible to increase the number of penstocks in the interior 124 of the dam 112 by widening the peripheral canal 120.

The hydroelectric turbine generation system 110 functions substantially similar to the previous embodiment in that water flows from the upper level of the reservoir 114 through the sluice gates 116 and into the peripheral canal 120. Water flow through the sluice gates 116 may be controlled by conventional gate valves or the like. The water then flows downward through the penstocks 122 to operate the hydroelectric turbine generators 130a for electrical power generation. Each of the penstocks 122 can also include a conventional gate valve or other water control or shutoff device. The water then flows from the lower end of the penstocks 122 into the annular tunnel 140 within the interior 124 of the base 128 of the dam 112. The annular tunnel 140 is adapted to house an internal collection channel 126 and a return passage 132. The return passage 132 defines a fluid conduit extending from the annular tunnel 140 to the auxiliary power generation system 150. The annular tunnel 140 provides space for at least one additional hydroelectric turbine generator to increase power capacity.

Referring to FIG. 4, as the water flows downward through the penstocks 122 from the externally disposed peripheral canal 120, the flowing water provides the hydrodynamic forces to operate the hydroelectric turbine generators 130a in order to convert the same into useable energy. At the lower end of the dam 112 the flowing water enters the internal collection channel 126 located within the annular tunnel 140 where additional power can be generated by the additional hydroelectric turbine generator contained therein.

Figure 5:
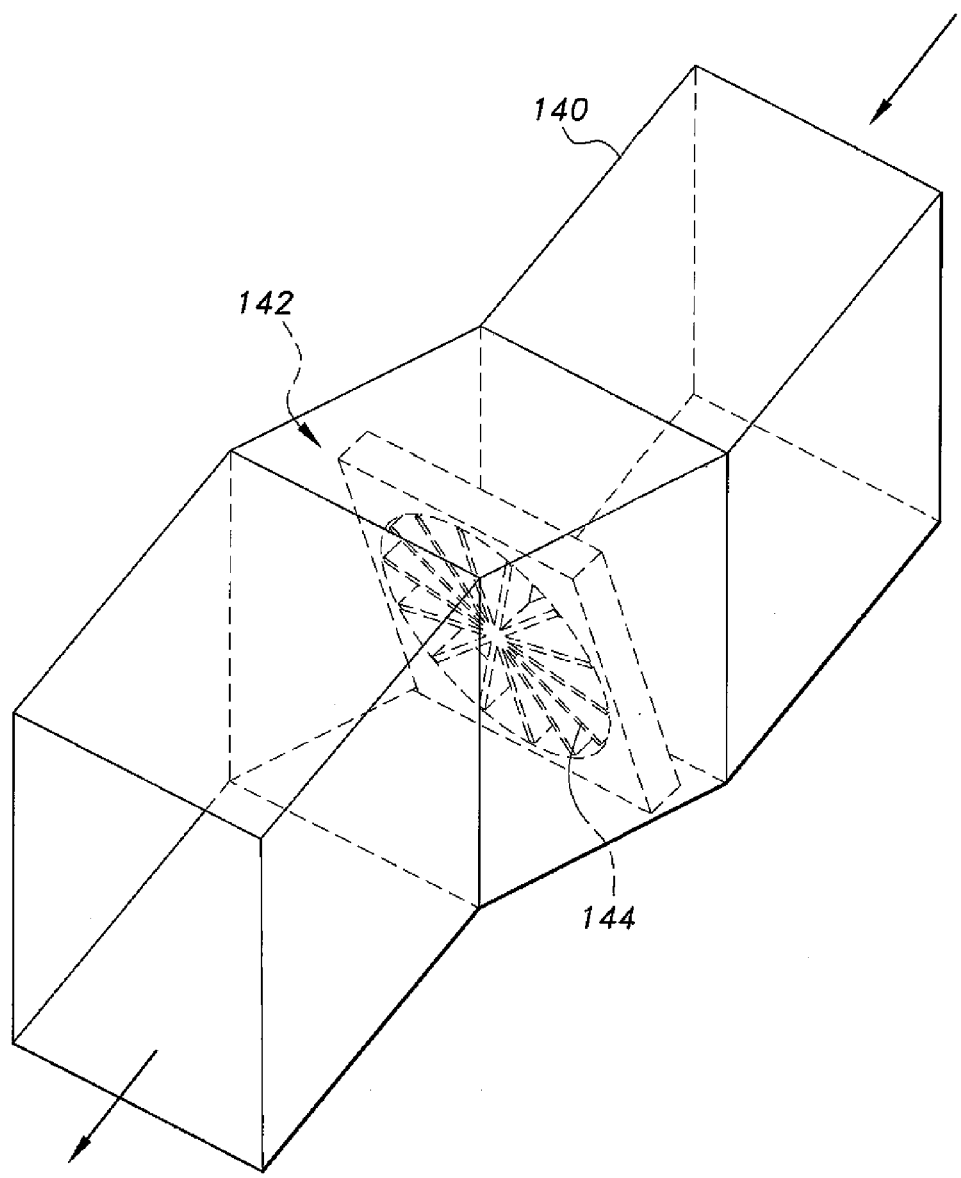
FIG. 5 is a diagrammatic perspective view of a turbine for the hydroelectric power generating system shown in FIG. 3.

The additional hydroelectric turbine generator can be the same as the hydroelectric turbine generator 130a disposed in the stepped areas of the penstock 122. However, there can be instances in which much of the pressure head can be lost or low. In order to compensate for this lost pressure, the annular tunnel 140 can be provided with another embodiment of a turbine, as illustrated in FIG. 5. The turbine 142 can be a very low head turbine, which includes a plurality of blades 144 radiating in a fan configuration. The blades 144 are desirably configured so that minimal hydrodynamic forces are required to rotate the same. It is to be noted that the turbine 142 can operate even when pressure loss is minimal.

After the water flows through the annular tunnel 140, the water is expelled through respective return passages 132. A pump 134 is provided in or along the return passage 132 to deliver water from the internal collection channel 126 towards the auxiliary power generating system 150 when the pressure of the expelled water is not enough to propel the water from the internal collection channel 126 into the auxiliary power generation system 150. While only a single annular tunnel 140 and pump 134 are shown, it will be understood that a plurality of these components can be provided, if desired. As in the first embodiment, while the power required to operate the pump 134 can be great, the pump 134 can be operated at times of low electrical power demand by consumers to enable the hydroelectric power generating system 110 to function. A powerhouse 136 is provided external to the base 128 of the dam 112 to control and distribute electrical power generated by the system, and to control and operate the pump 134 as well. A conventional external energy source provides the energy to operate the powerhouse.

Unlike the previous of the hydroelectric power generator 10, the hydroelectric power generator system 110 utilizes the water expelling from the lower portion of the penstocks 122 to generate additional power through the auxiliary power generation system 150. The auxiliary power generating system 150 of the hydroelectric power generating system 110 includes an elongated column 152 extending from the bottom of the reservoir 114 toward the top of the reservoir 114, as generally illustrated in FIG. 3 of the drawings. Due to the operating environment, the column 152 is provided with a relatively wide base 153 to provide a stable support. As shown, the base can be constructed as a substantially conical flute. It should be noted, however, other variants of the base can be provided for the base such as block support structures or any other desired shape that can provide stability. The column 152 can have a generally cylindrical configuration, as shown in FIG. 3, or can have any other desired external shape or configuration. The column 152 is in communication with at least one compressor unit 155, such as an air compressor unit, that creates air current and includes at least one (and preferably a plurality of) hydroelectric turbine generator 130b installed within the column 152. The hydroelectric turbine generators 130b can be arranged along the circumference of the inner wall of the column 152, as generally illustrated in FIG. 4 of the drawings, on at least one (and preferably a plurality of) horizontal support beam 156 within the column 152, as generally illustrated in FIG. 6A of the drawings, on at least one (and preferably a plurality of) vertical support beam 158 within the column 152, as generally illustrated in FIG. 6B of the drawings, or can be arranged in a combination of these configurations.

Figure 6A:
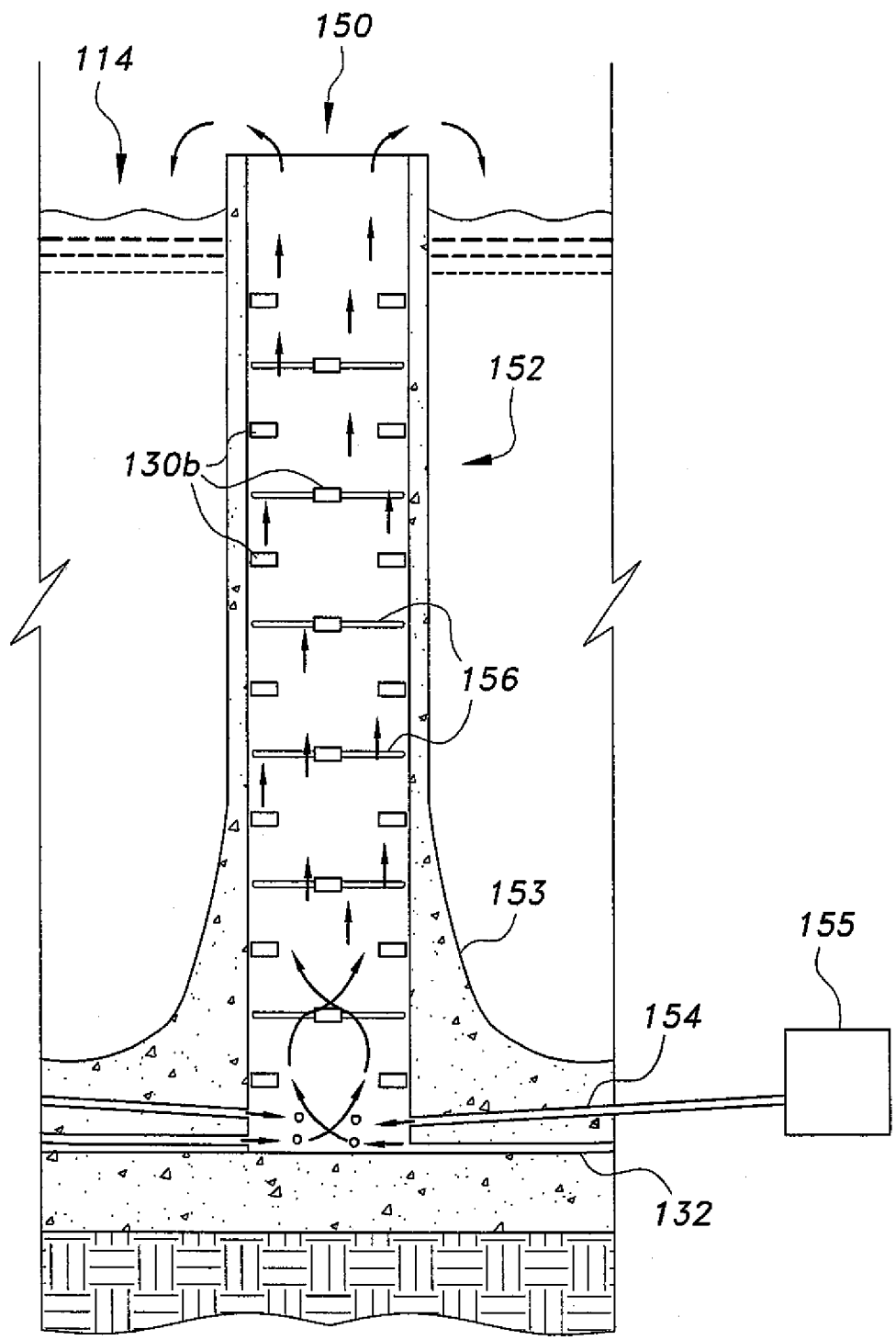
FIG. 6A is a diagrammatic sectional view of an auxiliary power generating system in the hydroelectric power generating system shown in FIG. 3, illustrating its general features.
Figure 6B:
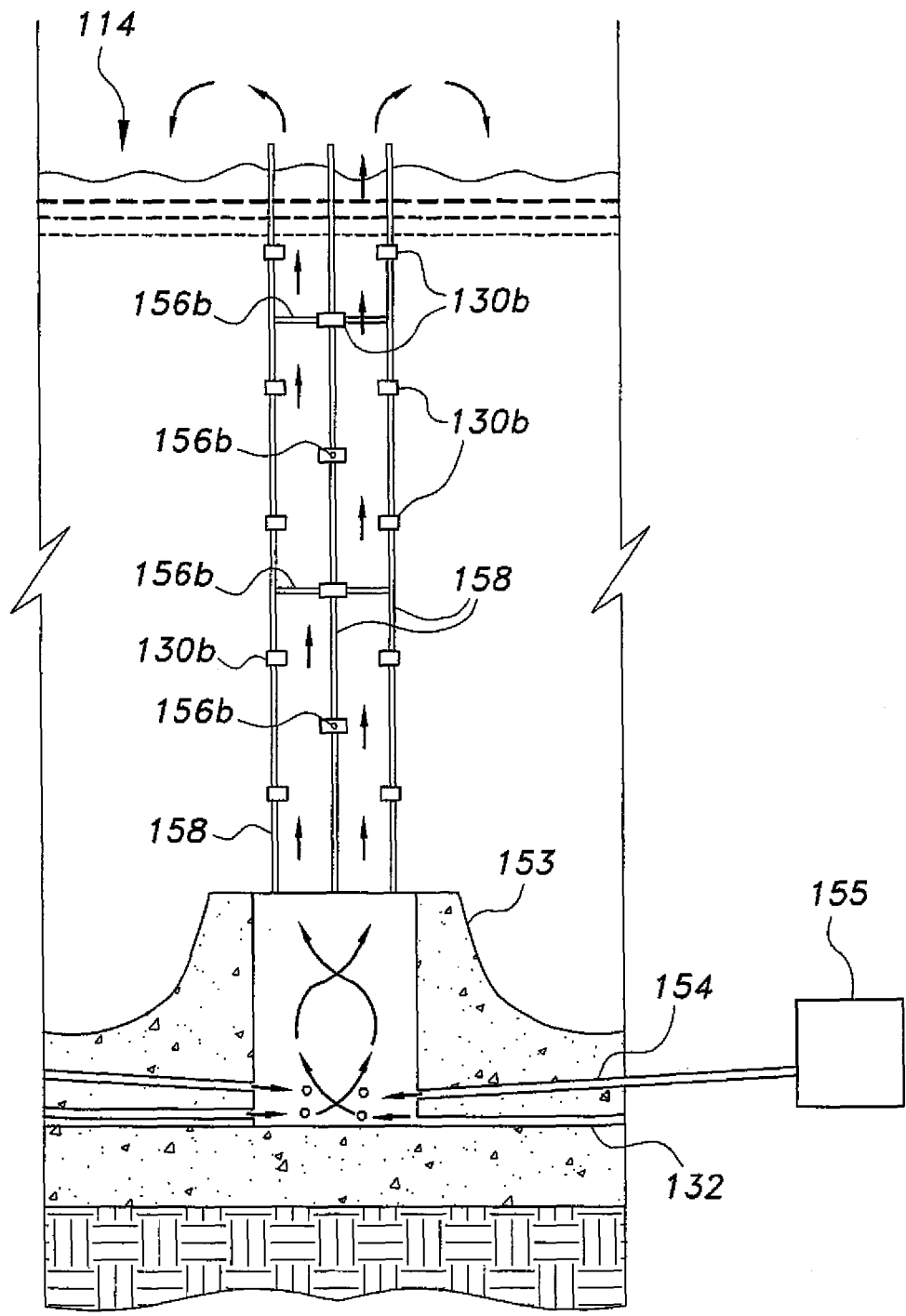
FIG. 6B is a diagrammatic sectional view of another embodiment of an auxiliary power generating system in the hydroelectric power generating system shown in FIG. 3, illustrating its general features.

Referring to FIGS. 6A and 6B, the water flowing out of the return passage 132 and into the auxiliary power generating system 150, it is mixed with air from the compression unit 155 once in the column 152. The water pressure at the exit is preferably high to move water up the column 152. High pressure can be provided by several different mechanisms. For example, the return passage 132 can be construed so that is progressively constricts towards the outlet, a nozzle can be provided at the outlet, the pump 134 can be operated at high pressure, and the like. As the water is being introduced into the column 152, it is aerated by the air blowing into the column 152 from the compressor unit 155 that provides air through at least one inlet 154. The return passage 132 can be arranged so that the outlet thereof enters the column 152 at a substantial tangent so as to induce swirling and mixing of the water and air. The aerated water flows upward through the column 152 with sufficient velocity and momentum to operate the at least one hydroelectric turbine generator 130b located within the column 152 for electrical power generation. After the water is propelled upward through the hydroelectric turbine generators 130b, the aerated water expels back into the reservoir 114 as depicted by the arrows in FIGS. 6A and 6B of the drawings.

The embodiment auxiliary power generation system illustrated in FIG. 6B is substantially the same as that shown in FIG. 6A. However, the auxiliary power generation system 150 includes a plurality of vertical support beams 158 arranged in a circular pattern forming a substantially cylindrical cage. Unlike FIG. 6A the substantially cylindrical cage does not have an outer wall, the vertical support beams 158 are free-standing from the base 153. Cross support can be provided by horizontal support beams, as illustrated by the horizontal support beams 156b.

The alternative embodiment of the hydroelectric power generating system 110 as generally illustrated in FIGS. 3-5, 6A, and 6B of the drawings is a closed system, i.e., water is not permitted to escape the system, except by evaporation and/or leakage. This is because the water to be used in the hydroelectric power generating system 110 is taken from the sea, i.e., it is salt water unsuited for irrigation or potable consumption. The salt water is pumped from a suitable oceanic source through a seawater delivery line 138 that communicates with the reservoir 114, as shown in FIG. 3, to fill the reservoir volume 114 initially. The use of seawater with the hydroelectric power generation system 110 may provide a number of benefits. The construction of a large number of very large systems on otherwise unusable land (desert, etc.) could accept a small percentage of the water of the present oceans and seas of the planet, and thereby reduce the rising sea level trend that has developed, at least to some small extent. The recreational value of such installations when constructed near large population centers has been noted further above. Some persons may find that swimming or bathing in the salt water may provide certain benefits, and the construction of such systems convenient to their homes serves to facilitate access. The relatively large volume of salt water contained by very large dams 112, or by a series of such dams 112, will provide support for a large number of fish and other marine animals. These fish and/or marine animals may be harvested for edible consumption, and/or the reservoir volumes may serve as habitats for endangered species. The hydroelectric power generating system can be adapted to include a filtration system to prevent any unwanted materials, such as trash, from entering the hydroelectric power generating system and obstructing the hydroelectric power generators. The filtration system can also be adapted to include a mechanism to control bacteria to protect the hydroelectric turbine generators from failing. Accordingly, the present hydroelectric power generating system provides a number of benefits in addition to potential power production.

It is to be understood that the present invention is not limited to the embodiments described above, but encompasses any and all embodiments within the scope of the following claims.

I claim:

1. A hydroelectric power generating system, comprising:
a dam having an upper portion, a base, and an interior;
a reservoir enclosed laterally by the dam, the dam completely surrounding and defining the reservoir therein, the reservoir having a top and a bottom;
at least one sluice gate disposed in the upper portion of the dam;
a peripheral canal disposed about the upper portion of the dam, the reservoir selectively communicating with the canal through the at least one sluice gate;
at least one penstock extending from the canal, the penstock being disposed within the interior of the dam;
at least one hydroelectric turbine generator disposed in the at least one penstock;
a collection channel disposed within the base of the dam, the collection channel communicating with the penstock;
an auxiliary power generating system disposed within the dam; wherein the auxiliary power generating system includes:
 i) a column extending from the bottom of the reservoir towards the top of the reservoir;
 ii) a plurality of hydroelectric power generators disposed within the column at spaced apart vertical heights within the column;
 iii) at least one compressor unit in communication with the column;
 iv) a return passage disposed in the base of the dam between the collection channel and the auxiliary power generating system, the return passage defining a fluid conduit extending from the collection channel communicating to the auxiliary power generating system, wherein the return passage enters the column at a tangent so as to induce swirling of the fluid;
a turbine disposed in the collection channel;
a return pump disposed in the return passage; and
a power house disposed at the base of the dam, the powerhouse including means for supplying electrical energy to the return pump from an external source.

2. The hydroelectric power generating system according to claim 1, wherein:
the dam is substantially cylindrical; and
the at least one penstock is arranged in a step configuration and defines a generally helical arc.

3. The hydroelectric power generating system according to claim 1, wherein:
said at least one hydroelectric turbine generator comprises a plurality of hydroelectric turbine generators disposed in the at least one penstock and
said the at least one penstock arranged in a step configuration and defines a generally helical arc.

4. The hydroelectric power generating system according to claim 1, wherein:
said at least one sluice gate comprises a plurality of sluice gates disposed in the upper portion of the dam; and
said at least one penstock comprises a plurality of penstocks extending from the canal.

5. The hydroelectric power generating system according to claim 1, further comprising:
a sea water delivery line communicating with the reservoir.

* * * * *